(12) United States Patent
Wang

(10) Patent No.: US 9,887,748 B2
(45) Date of Patent: Feb. 6, 2018

(54) INTERFERENCE SUPPRESSION METHOD AND APPARATUS

(71) Applicant: Huawei Technologies Co., Ltd., Shenzhen (CN)

(72) Inventor: Xuesong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/171,757

(22) Filed: Jun. 2, 2016

(65) Prior Publication Data
US 2016/0285528 A1  Sep. 29, 2016

Related U.S. Application Data

(63) Continuation of application No. PCT/CN2014/092802, filed on Dec. 2, 2014.

(30) Foreign Application Priority Data

Dec. 2, 2013 (CN) .......................... 2013 1 0637099

(51) Int. Cl.
*H04B 7/04* (2017.01)
*H04B 7/0456* (2017.01)
(Continued)

(52) U.S. Cl.
CPC ........... *H04B 7/0456* (2013.01); *H04B 1/525* (2013.01); *H04B 7/0413* (2013.01); *H04B 15/02* (2013.01); *H04B 15/00* (2013.01)

(58) Field of Classification Search
CPC ...... H04B 7/0413; H04B 1/525; H04B 15/02; H04B 7/0456; H04B 15/00
See application file for complete search history.

(56) References Cited

U.S. PATENT DOCUMENTS 8,599,976 B2 * 12/2013 Gomadam ........... H04B 7/0413
                                                            375/299
8,811,523 B1 *  8/2014 Gomadam ........... H04B 7/0452
                                                            375/260
(Continued)

FOREIGN PATENT DOCUMENTS

CN      101304301 A    11/2008
CN      103067062 A     4/2013
(Continued)

OTHER PUBLICATIONS

Fu et al., "Distributed Precoding Technology of Reducing Inter-cell interference in LTE Downlink," IEEE 3rd International Conference on Communication Software and Networks, pp. 369-372, Institute of Electrical and Electronics Engineers, New York, New York (2011).

(Continued)

*Primary Examiner* — Jean B Corrielus
(74) *Attorney, Agent, or Firm* — Leydig, Voit & Mayer, Ltd.

(57) ABSTRACT

Embodiments of the present invention provide an interference suppression method and apparatus. The method includes: determining a precoding matrix according to a channel fading matrix, where the channel fading matrix is an N×M matrix, M is a quantity of antennas of a transmit end candidate device, N is a quantity of antennas of a receive end device, and each element in the channel fading matrix represents channel fading that occurs when each antenna of the transmit end candidate device transmits a signal to each antenna of the receive end device; acquiring a receiving base vector according to the precoding matrix, signal power of the transmit end candidate device, and a channel fading matrix from a signal to the receive end device; and determining receiving subspace according to the receiving base (Continued)

vector and receiving, in the receiving subspace, a signal sent by a transmit end selected device.

16 Claims, 4 Drawing Sheets

(51) Int. Cl.
*H04B 7/0413* (2017.01)
*H04B 1/525* (2015.01)
*H04B 15/02* (2006.01)
*H04B 15/00* (2006.01)

(56) References Cited

U.S. PATENT DOCUMENTS

| | | |
|---|---|---|
| 2011/0177834 A1 | 7/2011 | Shin et al. |
| 2013/0301746 A1 | 11/2013 | Mobasher et al. |
| 2016/0164584 A1* | 6/2016 | Jongren ............... H04B 7/0413 370/329 |

FOREIGN PATENT DOCUMENTS

| | | |
|---|---|---|
| CN | 103166685 A | 6/2013 |
| CN | 103269238 A | 8/2013 |
| WO | WO 2012114148 A1 | 8/2012 |
| WO | WO 2013017902 A1 | 2/2013 |
| WO | WO 2013143076 A1 | 10/2013 |

OTHER PUBLICATIONS

Wang, "Research on Interference Alignment in Multi-Cell Systems," University of Science and Technology of China, Master's Degree Thesis, pp. 0-51 (2011).

Yang et al., "Opportunistic Interference Alignment for MIMO Interfering Multiple-Access Channels," IEEE Transactions on Wireless Communications, vol. 12, No. 5, pp. 2180-2192, Institute of Electrical and Electronics Engineers, New York, New York (May 2013).

* cited by examiner

INTERFERENCE SUPPRESSION METHOD AND APPARATUS

CROSS-REFERENCE TO RELATED APPLICATIONS

This application is a continuation of International Patent Application No. PCT/CN2014/092802, filed on Dec. 2, 2014, which claims priority to Chinese Patent Application No. 201310637099.1, filed on Dec. 2, 2013, both of which are hereby incorporated by reference in their entireties.

TECHNICAL FIELD

Embodiments of the present invention relate to communications technologies, and in particular, to an interference suppression method and apparatus.

BACKGROUND

On a cell edge, there exist both a signal from a current cell and a signal from a neighboring cell. The signal from the neighboring cell causes adjacent cell interference (ACI for short) to the current cell, thereby severely affecting communications quality.

To suppress ACI, an opportunistic interference alignment (OIA for short) technology is used in the prior art, so that power of a desired signal received by a base station is as high as possible. Uplink transmission in a homogeneous network is used as an example for description herein. In an uplink transmission process, a receiving base vector of each base station is preset on the base station, and each receiving base vector is used to determine receiving subspace in which a signal sent on a current time-frequency resource block by a user equipment in a current cell is received; at the same time, power of signals (that is, interference signals) that are not sent by the user equipment in the current cell and are received by the base station is calculated, and the interference power information is sent to another base station, so that an exchange of the interference power information between base stations is completed, so as to implement that each base station acquires an interference leakage value of user equipment in a current cell; afterward, each base station may select user equipment with a minimum interference leakage value from the user equipment in the current cell, and receive, in the receiving subspace, a signal sent by the selected user equipment, thereby implementing ACI suppression in the uplink transmission process.

In the prior art, signal energy of user equipment in a current cell still leaks partially, which results in deterioration in communications quality between the user equipment and a base station.

SUMMARY

Embodiments of the present invention provide an interference suppression method and apparatus, which resolve a problem that a base station inefficiently receives a signal of user equipment in a current cell because of ACI, so as to implement that the base station efficiently receives a signal sent by user equipment in the current cell, thereby obtaining a relatively high received signal to interference plus noise ratio.

According to a first aspect, an embodiment of the present invention provides an interference suppression method, including:

determining a precoding matrix according to a channel fading matrix, where the channel fading matrix is an N×M matrix, where M is a quantity of antennas of a transmit end candidate device, N is a quantity of antennas of a receive end device, both M and N are positive integers, and each element in the channel fading matrix is used to represent channel fading that occurs when each antenna of the transmit end candidate device transmits a signal to each antenna of the receive end device;

acquiring a receiving base vector according to the precoding matrix, signal power of the transmit end candidate device, and a channel fading matrix that the signal undergoes when being sent to the receive end device; and determining receiving subspace according to the receiving base vector, and receiving, in the receiving subspace, a signal sent by a transmit end selected device, where the transmit end selected device is a device that is selected by the receive end device from a transmit end candidate device and layer quantity pair and that meets a preset interference leakage condition.

With reference to the first aspect, in a first possible implementation manner of the first aspect, the determining a precoding matrix according to a channel fading matrix includes:

performing singular value decomposition on the channel fading matrix, so that the precoding matrix is a matrix that is constituted by min(M, N) right singular vectors corresponding to min(M, N) maximum eigenvalues obtained after the singular value decomposition is performed, where min(M, N) indicates acquiring of the smaller value between M and N.

With reference to the first aspect, in a second possible implementation manner of the first aspect, the acquiring a receiving base vector according to the precoding matrix, signal power of the transmit end candidate device, and a channel fading matrix that the signal undergoes when being sent to the receive end device includes:

according to the precoding matrix, the signal power of the transmit end candidate device, and the channel fading matrix that the signal undergoes when being sent to the receive end device, acquiring a receive matrix satisfying the following expression as a receiving base vector:

$$U_m = \arg\max_{U^H U = I} U^H \left[ \sum_{\substack{(k,t) \in A \\ k \in \mu(m)}} (P_{k,t} H_{mk} v_{k,t} v_{k,t}^H H_{mk}^H) \right] U$$

where, U is an N×S-dimensional complex matrix, and S indicates a quantity of signal streams that the receive end device needs to receive; a superscript H indicates conjugate transpose;

$$\max_{U^H U = I}$$

indicates calculating of a maximum value of the matrix function in all U meeting a condition $U^H U = I$, and I is an identity matrix; arg indicates calculating of a corresponding independent variable value $U_m$ when the maximum value of the matrix function is acquired; k is a number of the transmit end candidate device, $1 \le k \le \mu(m)$, t is a number of each column in the precoding matrix of the transmit end candidate device, that is, a number of a min(M, N) layer in space and at which multiplexing is performed, $1 \le t \le \min(M, N)$, µ(m) indicates a set of transmit end candidate device, served by m, and A={(k,t):1≤k≤µ(m),1≤t≤min(M, N)} indicates a set of all possible transmit end candidate device and layer quantity pairs; $v_{k,t}$ indicates the $t^{th}$ column in a precoding matrix of the $k^{th}$ transmit end candidate device, $P_{k,t}$ is transmit power of the $k^{th}$ transmit end candidate device at the $t^{th}$ layer of the space, and a channel fading matrix through which the signal passes to m is $H_{mk}$; and Σ indicates summation calculation.

With reference to the second possible implementation manner of the first aspect, in a third possible implementation manner of the first aspect, the received matrix is a matrix that is constituted by character vectors corresponding to S maximum eignvalues of $$\sum_{\substack{(k,t) \in A \\ k \in \mu(m)}} (P_{k,t} H_{mk} v_{k,t} v_{k,t}^H H_{mk}^H).$$

With reference to the first possible implementation manner of the first aspect, in a fourth possible implementation manner of the first aspect, the receive end device includes a macro receive end device and a pico receive end device, and the transmit end candidate device includes a macro transmit end candidate device and a pico transmit end candidate device; and the acquiring a receiving base vector according to the precoding matrix, signal power of the transmit end candidate device, and a channel fading matrix from the signal to the base station includes:

determining, by the macro receive end device, a preset quantity of macro transmit end candidate device and layer quantity pairs according to a preset rule;

acquiring, by the macro receive end device, a receiving base vector of the macro receive end device according to a channel fading matrix from the macro transmit end candidate device to the macro receive end device and a precoding matrix corresponding to the macro transmit end candidate device; and acquiring, by the pico receive end device, a receiving base vector of the pico receive end device according to a channel fading matrix from the macro transmit end candidate device to the pico receive end device and the precoding matrix corresponding to the macro transmit end candidate device.

With reference to the first aspect or any one of the first to the fourth possible implementation manners of the first aspect, in a fifth possible implementation manner of the first aspect, before the determining receiving subspace according to the receiving base vector, and receiving, in the receiving subspace, a signal sent by a transmit end selected device, the method further includes:

calculating an interference leakage value of the transmit end candidate device and layer quantity pair.

With reference to the fifth possible implementation manner of the first aspect, in a sixth possible implementation manner of the first aspect, the calculating an interference leakage value of the transmit end candidate device and layer quantity pair includes:

calculating, according to the following formula, an interference leakage value generated when the transmit end candidate device performs transmission at the $t^{th}$ space layer:

$$IL_{k,t} = P_{k,t} \sum_{m \neq \beta(k)} \|U_m^H H_{mk} v_{k,t}\|_F^2$$

where, $U_m$ is a receive matrix of a receive end device m, and a superscript H indicates conjugate transpose; k is a number of the transmit end candidate device, 1≤k≤µ(m), t is a number of each column in the precoding matrix of the transmit end candidate device, that is, a number of a min(M, N) layer in space and at which multiplexing is performed, 1≤t≤min(M, N), $v_{k,t}$ indicates the $t^{th}$ column in a precoding matrix of the $k^{th}$ transmit end candidate device, $P_{k,t}$ transmit power of the $k^{th}$ transmit end candidate device at the $t^{th}$ layer of the space, and a channel fading matrix through which the signal passes to m is $H_{mk}$; $IL_{k,t}$ is an interference leakage value generated, when a transmit end device k performs transmission at the $t^{th}$ layer, at each receive end device that does not serve k; β(k) indicates a receive end device that serves k; $\|U^H H_{mk} v_{k,t}\|_F^2$ indicates calculating of F-norm for $U^H H_{mk} v_{k,t}$; and Σ indicates summation calculation.

With reference to the sixth possible implementation manner of the first aspect, in a seventh possible implementation manner of the first aspect, after the calculating an interference leakage value of the transmit end candidate device and layer quantity pair, the method further includes:

selecting, as a transmit end selected device according to the interference leakage value obtained through calculation, a device that meets the preset interference leakage condition from the transmit end candidate device and layer quantity pair.

With reference to the seventh possible implementation manner of the first aspect, in an eighth possible implementation manner of the first aspect, the preset interference leakage condition includes:

an interference leakage value is minimum; or the preset interference leakage condition is a preset value, and an interference leakage value less than or equal to the preset value meets the preset interference leakage condition.

According to a second aspect, an embodiment of the present invention provides an interference suppression apparatus, including:

a determining module, configured to determine a precoding matrix according to a channel fading matrix, where the channel fading matrix is an N×M matrix, where M is a quantity of antennas of a transmit end candidate device, N is a quantity of antennas of a receive end device, both M and N are positive integers, and each element in the channel fading matrix is used to represent channel fading that occurs when each antenna of the transmit end candidate device transmits a signal to each antenna of the receive end device;

an acquiring module, configured to acquire a receiving base vector according to the precoding matrix, signal power of the transmit end candidate device, and a channel fading matrix that the signal undergoes when being sent to the receive end device; and a receiving module, configured to determine receiving subspace according to the receiving base vector and receive, in the receiving subspace, a signal sent by a transmit end selected device, where the transmit end selected device is a device that is selected by the receive end device from a transmit end candidate device and layer quantity pair and that meets a preset interference leakage condition.

With reference to the second aspect, in a first possible implementation manner of the second aspect, the determining module is specifically configured to:

perform singular value decomposition on the channel fading matrix, so that the precoding matrix is a matrix that is constituted by min(M, N) right singular vectors corresponding to min(M, N) maximum eigenvalues obtained after the singular value decomposition is performed, where min (M, N) indicates acquiring of the smaller value between M and N.

With reference to the second aspect, in a second possible implementation manner of the second aspect, the acquiring module is specifically configured to:

according to the precoding matrix, the signal power of the transmit end candidate device, and the channel fading matrix that the signal undergoes when being sent to the receive end device, acquire a receive matrix satisfying the following expression as a receiving base vector:

$$U_m = \arg \max_{U^H U = I} U^H \left[ \sum_{\substack{(k,t) \in A \\ k \in \mu(m)}} (P_{k,t} H_{mk} v_{k,t} v_{k,t}^H H_{mk}^H) \right] U$$

where, U is an N×S-dimensional complex matrix, and S indicates a quantity of signal streams that the receive end device needs to receive; a superscript H indicates conjugate transpose;

$$\max_{U^H U = I}$$

indicates calculating of a maximum value of the matrix function in all U meeting a condition $U^H U = I$, and I is an identity matrix; arg indicates calculating of a corresponding independent variable value $U_m$ when the maximum value of the matrix function is acquired; k is a number of the transmit end candidate device, $1 \leq k \leq \mu(m)$, t is a number of each column in the precoding matrix of the transmit end candidate device, that is, a number of a min(M, N) layer in space and at which multiplexing is performed, $1 \leq t \leq \min(M, N)$, $\mu(m)$ indicates a set of transmit end candidate devices served by m, and $A = \{(k,t): 1 \leq k \leq \mu(m), 1 \leq t \leq \min(M, N)\}$ indicates a set of all possible transmit end candidate device and layer quantity pairs; $v_{k,t}$ indicates the $t^{th}$ column in a precoding matrix of the $k^{th}$ transmit end candidate device, $P_{k,t}$ is transmit power of the $k^{th}$ transmit end candidate device at the $t^{th}$ layer of the space, and a channel fading matrix through which the signal passes to m is $H_{mk}$; and $\Sigma$ indicates summation calculation.

With reference to the second possible implementation manner of the second aspect, in a third possible implementation manner of the second aspect, the receive matrix is a matrix that is constituted by character vectors corresponding to S maximum eigenvalues of $$\sum_{\substack{(k,t) \in A \\ k \in \mu(m)}} (P_{k,t} H_{mk} v_{k,t} v_{k,t}^H H_{mk}^H).$$

With reference to the first possible implementation manner of the second aspect, in a fourth possible implementation manner of the second aspect, the receive end device includes a macro receive end device and a pico receive end device, and the transmit end candidate device includes a macro transmit end candidate device and a pico transmit end candidate device; and the acquiring module includes:

a determining unit, configured to determine a preset quantity of macro transmit end candidate device and layer quantity pairs according to a preset rule;

a first acquiring unit, configured to acquire a receiving base vector of the macro receive end device according to a channel fading matrix from the macro transmit end candidate device to the macro receive end device and a precoding matrix corresponding to the macro transmit end candidate device; and a second acquiring unit, configured to acquire a receiving base vector of the pico receive end device according to a channel fading matrix from the macro transmit end candidate device to the pico receive end device and the precoding matrix corresponding to the macro transmit end candidate device.

With reference to the second aspect or any one of the first to the fourth possible implementation manners of the second aspect, in a fifth possible implementation manner of the second aspect, the apparatus further includes:

a calculating module, configured to calculate an interference leakage value of the transmit end candidate device and layer quantity pair.

With reference to the fifth possible implementation manner of the second aspect, in a sixth possible implementation manner of the second aspect, the calculating module is specifically configured to:

calculate, according to the following formula, an interference leakage value generated when the transmit end candidate device performs transmission at the $t^{th}$ space layer:

$$IL_{k,t} = P_{k,t} \sum_{m \neq \beta(k)} \|U_m^H H_{mk} v_{k,t}\|_F^2$$

where, $U_m$ is a receive matrix of a receive end device m, and a superscript H indicates conjugate transpose; k is a number of the transmit end candidate device, $1 \leq k \leq \mu(m)$, t is a number of each column in the precoding matrix of the transmit end candidate device, that is, a number of a min(M, N) layer in space and at which multiplexing is performed, $1 \leq t \leq \min(M, N)$, $v_{k,t}$ indicates the $t^{th}$ column in a precoding matrix of the $k^{th}$ transmit end candidate device, $P_{k,t}$ is transmit power of the $k^{th}$ transmit end candidate device at the $t^{th}$ layer of the space, and a channel fading matrix through which the signal passes to m is $H_{mk}$; $IL_{k,t}$ is an interference leakage value generated, when a transmit end device k performs transmission at the $t^{th}$ layer, at each receive end device that does no serve k; $\beta(k)$ indicates a receive end device that serves k; $\|U^H H_{mk} v_{k,t}\|_F^2$ indicates calculating of F-norm for $U^H H_{mk} v_{k,t}$; and $\Sigma$ indicates summation calculation.

With reference to the sixth possible implementation manner of the second aspect, in a seventh possible implementation manner of the second aspect, the apparatus further includes:

a selecting module, configured to select, as a transmit end selected device according to the interference leakage value obtained through calculation, a device that meets the preset interference leakage condition from the transmit end candidate device and layer quantity pair.

With reference to the seventh possible implementation manner of the second aspect, in an eighth possible implementation manner of the second aspect, the preset interference leakage condition includes:

an interference leakage value is minimum; or the preset interference leakage condition is a preset value, and an interference leakage value less than or equal to the preset value meets the preset interference leakage condition.

According to the interference suppression method and apparatus provided in the embodiments of the present invention, ACI can be suppressed, which implements that a receive end device efficiently receives a signal sent by a transmit end selected device in a current cell, and a relatively high received signal to interference plus noise ratio and transmission rate can be obtained.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
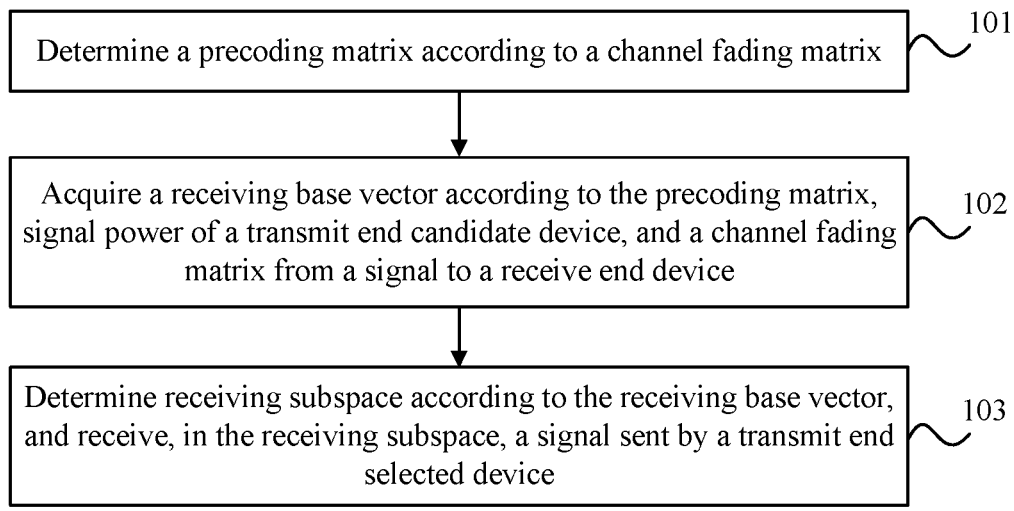
FIG. 1 is a flowchart of a first embodiment of an interference suppression method according to the present invention.

FIG. 1 is a flowchart of a first embodiment of an interference suppression method according to the present invention. As shown in FIG. 1, the interference suppression method provided in this embodiment of the present invention may be executed by an interference suppression apparatus, and the apparatus may be implemented by using software and/or hardware and is integrated in a base station or user equipment. The interference suppression method provided in this embodiment includes:

Step 101: Determine a precoding matrix according to a channel fading matrix.

The channel fading matrix is an N×M matrix, where M is a quantity of antennas of a transmit end candidate device, N is a quantity of antennas of a receive end device, both M and N are positive integers, and each element in the channel fading matrix is used to represent channel fading that occurs when each antenna of the transmit end candidate device transmits a signal to each antenna of the base station. In a specific implementation process, when a base station is used as a receive end device, the transmit end candidate device includes user equipment served by the base station, that is, user equipment of a current cell and user equipment of a neighboring cell; when user equipment is used as a receive end device, the transmit end candidate device includes a base station of a cell in which the user equipment is located, and a base station of a neighboring cell.

Persons skilled in the art may understand that each transmit end candidate device corresponds to one precoding matrix. For example, when a base station is used as a receive end device, the precoding matrix is determined by the base station according to a channel fading matrix obtained by means of channel estimation; and the base station sends the precoding matrix to corresponding user equipment, and the user equipment performs preprocessing on a to-be-sent signal, so as to facilitate that the base station performs signal detection after receiving the signal.

Step 102: Acquire a receiving base vector according to the precoding matrix, signal power of a transmit end candidate device, and a channel fading matrix from the signal to a receive end device.

Similar to the prior art, each receive end device needs to determine a receiving base vector first; but a difference from the prior art is that the receiving base vector of the receive end device in the present invention is not selected randomly, and it is further required to consider matching between a receiving base vector and a signal sent by the transmit end candidate device, so that signals sent by the transmit end candidate device fall, as many as possible, within receiving subspace spanned by the receiving base vector.

In addition, because factors such as channel state information (Channel State Information, CSI for short), the precoding matrix, and the receiving base vector affect a transmission rate of a signal, when the receiving base vector is relatively matched with the signal, it helps obtain a higher transmission rate.

Step 103: Determine receiving subspace according to the receiving base vector, and receive, in the receiving subspace, a signal sent by a transmit end selected device.

The transmit end selected device is a device that is selected by the receive end device from a transmit end candidate device and layer quantity pair and that meets a preset interference leakage condition, where the preset interference leakage condition may be that an interference leakage value is minimum, and a transmit end candidate device and layer quantity pair with the minimum interference leakage value is used as the transmit end selected device; or the preset interference leakage condition is a preset value, and an interference leakage value less than or equal to the preset value meets the preset interference leakage condition; in this case, a transmit end candidate device and layer quantity pair that meets the preset interference leakage condition is used as the transmit end selected device.

Because of existence of multiple antennas of the transmit end candidate device, each transmit end candidate device may perform multiplexing for a maximum of min(M, N) layer in space, where min indicates that a value M and a value N are compared, and that the smaller value is acquired and used as a quantity of layers at which the transmit end candidate device performs multiplexing. For example, t is used to indicate any one of the min(M, N) layer in the space and at which a transmit end candidate device k performs multiplexing, and (k, t) indicates a transmit end candidate device and layer quantity pair and indicates that k sends a signal at the $t^{th}$ layer to a receive end device corresponding to k.

In a specific implementation process, the receive end device, for example, a base station, notifies the corresponding transmit end selected device of the determined precoding matrix, and the transmit end selected device sends a signal by using the corresponding precoding matrix; after receiving the signal, the base station restores sending data of the served transmit end selected device by using various conventional linear detection algorithms.

In the interference suppression method provided in this embodiment of the present invention, ACI can be suppressed, so as to avoid a problem that a receive end device such as a base station (Base Station, BS for short) inefficiently receives a signal of a transmit end selected device such as user equipment (User Equipment, UE for short) because of the ACI, which implements that the receive end device efficiently receives a signal sent by a transmit end selected device of a current cell, thereby obtaining a relatively high received signal to interference plus noise ratio and transmission rate.

The interference suppression method provided in this embodiment may be applied to a homogeneous network or a heterogeneous network, where the homogeneous network includes a macro base station (MBS for short) and macro user equipment (MUE for short); the heterogeneous network includes an MBS, MUE, a pico base station (PBS for short), and pico user equipment (PUE for short). The macro base station has relatively high power and a relatively large coverage area; the pico base station has relatively low power and a relatively small coverage area. Each base station provides an access service for several users.

The following describes the technical solution of the method embodiment shown in FIG. 1 in detail by using several specific embodiments. In the embodiments, a base station is used as a receive end device, and user equipment is used as a transmit end candidate device and a transmit end selected device. Persons skilled in the art may interchange a transmit end and a receive end, that is, user equipment is used as a receive end device, and a base station is used as a transmit end candidate device and a transmit end selected device. Methods, principles, and implementation manners are similar in the two scenarios.

Figure 2:
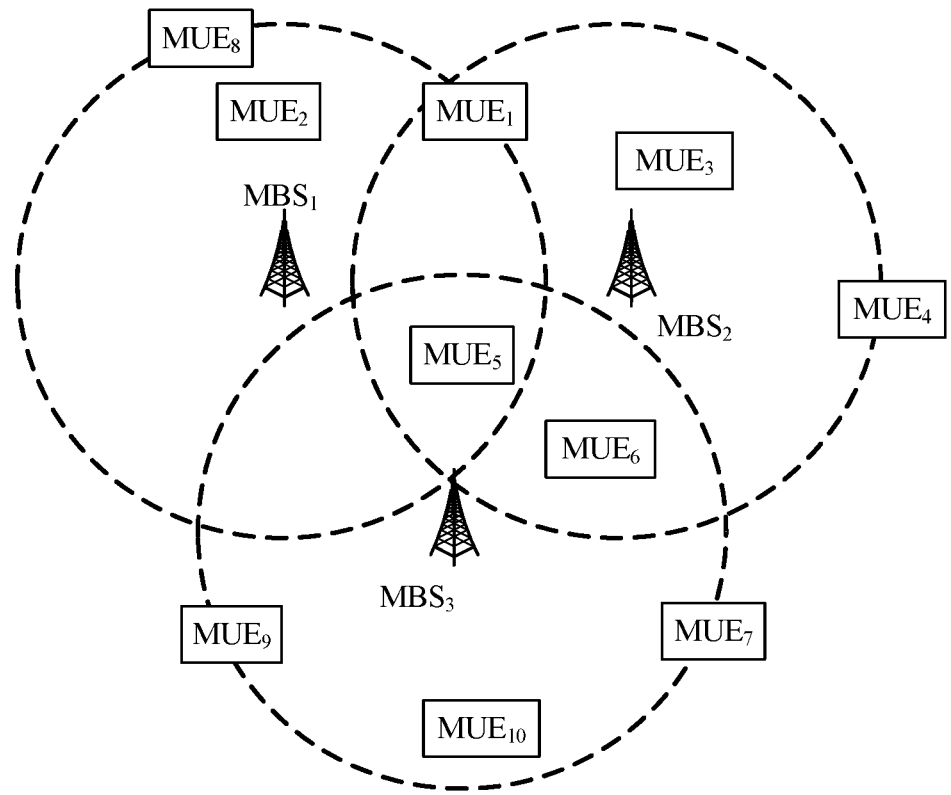
FIG. 2 is a diagram of an example of a homogeneous network in an application scenario according to an embodiment of the present invention.

FIG. 2 is a diagram of an example of a homogeneous network in an application scenario according to an embodiment of the present invention. As shown in FIG. 2, homogeneous structure includes macro user equipment $MUE_1$, $MUE_2$, ..., $MUE_9$, and $MUE_{10}$, as well as macro base stations $MBS_1$, $MBS_2$, and $MBS_3$. Persons skilled in the art may understand that, in a specific implementation process, the homogeneous structure may include multiple MUE or MBSs, which is not limited to a quantity in this embodiment. For ease of description, a macro base station m and macro user equipment k are used as examples for description in this embodiment, where the macro base station m is any one of the macro stations shown in FIG. 2, and the macro user equipment k is any one of the macro user equipment shown in FIG. 2. As shown in FIG. 2, a service range of each base station is a dashed line range that centers on a geographical location of the base station. The $MBS_1$ is used as an example, a service range covers the $MUE_2$ and $MUE_5$, and the $MUE_1$ and $MUE_8$ are on an edge of the service range of the $MBS_1$.

First, step 101 that determine a precoding matrix according to a channel fading matrix is described in detail in this embodiment.

In the prior art, a base station is equipped with N antennas, and user equipment is equipped with one antenna. On a current time-frequency resource block, it is deemed that a channel shows flat fading. User equipment l sends, at power $P_l$, a signal $x_l$ to a base station m that serves the user equipment l, where channel fading that the signal undergoes when being sent to the base station m is denoted as $H_{lm}$, and the channel fading is acquired according to channel estimation. In this case, $H_{lm}$ is an N×1-dimensional vector, A is defined as a set of all user equipments that send signals on the current time-frequency resource block, μ(m) indicates a set of user equipments served by the base station m, β(l) indicates a base station that serves the user equipment l, and a signal received by the base station m may be indicated as:

$$y_m = \sum_{l \in \mu(m) I A} H_{lm} x_l + \sum_{l \in \mu(m)/A} H_{lm} x_l + n_m \quad (1)$$

In the foregoing formula, a symbol "I" indicates acquiring of an intersection set of the left part and the right part of "I", "/" indicates acquiring of a difference set of the left part and the right part of "/", and $n_m$ indicates a noise vector at the base station m.

However, corresponding to the prior art, in this embodiment of the present invention, a transmit end candidate device is user equipment, and a receive end device is a base station, so that a difference between the present invention and the prior art is as follows: The transmit end candidate device is equipped with M antennas, and in this case, because of existence of multiple antennas of the transmit end candidate device, each transmit end candidate device may perform multiplexing for a maximum of min(M, N) layer in space, where min indicates that a value M and a value N are compared, and that the smaller value is acquired and used as a quantity of layers at which the transmit end candidate device performs multiplexing.

It is assumed that k is a number of the transmit end candidate device, 1≤k≤μ(m), t is a number of each column in the precoding matrix of the transmit end candidate device, that is, a number of a min(M, N) layer in space and at which multiplexing is performed, 1≤t≤min(M, N), μ(m) indicates a set of transmit end candidate devices served by a base station m, that is, the receive end device, and A={(k,t):1≤k≤μ(m), 1≤t≤min(M, N)} indicates a set of all possible transmit end candidate device and layer quantity pairs; $v_{k,t}$ indicates the $t^{th}$ column in a precoding matrix of the $k^{th}$ transmit end candidate device, $P_{k,t}$ is transmit power of the $k^{th}$ transmit end candidate device at the $t^{th}$ layer of the space, and a channel fading matrix through which the signal passes to m is $H_{mk}$.

The $k^{th}$ transmit end candidate device sends, at power $P_{k,t}$ at the $t^{th}$ layer of the space, a signal $x_{k,t}$ to the base station m that serves the $k^{th}$ transmit end candidate device, which corresponds to the $t^{th}$ column $v_{k,t}$ in the precoding matrix, and a signal received by the base station m in the present invention may be indicated as:

$$y_m = \sum_{\substack{(k,t) \in A \\ k \in \mu(m)}} H_{mk} v_{k,t} x_{k,t} + \sum_{\substack{(k,t) \in A \\ k \notin \mu(m)}} H_{mk} v_{k,t} x_{k,t} + n_m \quad (2)$$

By comparing formula (1) with formula (2), it is easy to learn: Before sending a signal, a multiple-antenna transmit end candidate device performs precoding processing on a to-be-sent signal by using a precoding matrix, where the precoding matrix is determined according to a channel fading matrix acquired by means of channel estimation. Determining the precoding matrix according to the channel fading matrix includes performing singular value decomposition on the channel fading matrix, so that the precoding matrix is a matrix that is constituted by min(M, N) right singular vectors corresponding to min(M, N) maximum eigenvalues obtained after the singular value decomposition is performed, where min(M, N) indicates acquiring of the smaller value between M and N.

Specifically, the precoding matrix is generated in the following manner:

A base station acquires, according to channel estimation, a channel fading matrix that a signal sent by user equipment served by the base station undergoes when being transmitted to the base station, for example, the channel fading matrix $H_{mk}$ that the transmit end candidate device k undergoes to the base station m that serves the transmit end candidate device k, and singular value decomposition (Singular Value Decomposition, SVD for short) is performed on $H_{mk}$ to obtain:

$$H_{mk} \stackrel{SVD}{=} U_{mk} \Lambda_{mk} V_{mk}^H \quad (3)$$

where, $U_{mk}$ is an M×M unitary matrix; $V_{mk}$ is an N×N unitary matrix, and a superscript H of $V_{mk}$ indicates the conjugate transpose operation; $\Lambda_{mk}$ is an M×N diagonal matrix, a main diagonal element is constituted by singular values of $H_{mk}$, and without loss of generality, singular values are arranged in descending order, and therefore, a vector $v_{k,t}$ of the $t^{th}$ column in $V_{mk}$ is exactly a right singular vector corresponding to the $t^{th}$ largest singular value of $H_{mk}$ and is normalized.

Step 102 of acquiring a receiving base vector according to the precoding matrix, signal power of a transmit end candidate device, and a channel fading matrix from the signal to a receive end device may be implemented in the following manner:

The sum of desired signals in signals that are sent by the transmit end candidate device k in a current cell and received by the base station is $$\sum_{\substack{(k,t) \\ k \in \mu(m)}} H_{mk} v_{k,t} x_{k,t},$$

a receive matrix is acquired according to the following formula, and a vector of each column in the receive matrix is used as the receiving base vector:

$$U_m = \arg\max_{U^H U = I} E\left( \sum_{\substack{(k,t) \in A \\ k \in \mu(m)}} \|U^H H_{mk} v_{k,t} x_{k,t}\|_F^2 \right) \quad (4)$$

$$= \arg\max_{U^H U = I} \left[ \sum_{\substack{(k,t) \in A \\ k \in \mu(m)}} (P_{k,t} \|U^H H_{mk} v_{k,t}\|_F^2) \right]$$

where, $U_m$ is the receive matrix;

$$\arg\max_{U^H U = I}$$

indicates that a value of U that is obtained through calculation and meets that a value of the part in [ ] is maximum is used as a value of $U_m$; U is an N×S-dimensional complex matrix, and S indicates a quantity of signal streams that the receive end device needs to receive; a superscript H indicates conjugate transpose; I is a unit vector; $\|U^H H_{mk} v_{k,t}\|_F^2$ indicates calculating of F-norm for $U^H H_{mk} v_{k,t}$; $\mu(m)$ indicates a set of user equipments served by m; and $\Sigma$ indicates summation calculation.

The second line of formula (4) is expanded to obtain:

$$\arg\max_{U^H U = I} \left[ \sum_{\substack{(k,t) \in A \\ k \in \mu(m)}} (P_{k,t} \|U^H H_{mk} v_{k,t}\|_F^2) \right] = \quad (5)$$

$$\arg\max_{U^H U = I} U^H \left[ \sum_{\substack{(k,t) \in A \\ k \in \mu(m)}} (P_{k,t} H_{mk} v_{k,t} v_{k,t}^H H_{mk}^H) \right] U$$

According to related knowledge of constrained optimization, it may be learned: U that enables acquiring of maximum values of the left part and the right part of formula (5) should be a matrix that is constituted by character vectors corresponding to S maximum eigenvalues of a matrix $\Sigma P_{k,t} H_{mk} v_{k,t} v_{kt}^H H_{mk}^H$, the matrix is used as the receive matrix of the base station, and a vector of each column in the matrix is used as a receiving base vector of each antenna of the base station, where S is a quantity of elements in a set $\mu(m)$I A, that is, a quantity of signal streams that the base station m needs to receive at the same time, and it is assumed that on a current time-frequency resource block, there are a maximum of S<N signal streams being transmitted between the base station and user equipment served by the base station.

Before step 103 of determining receiving subspace according to the receiving base vector, and receive, in the receiving subspace, a signal sent by a transmit end selected device, the method may further include: calculating an interference leakage value of the transmit end candidate device and layer quantity pair.

Similar to the prior art, the interference leakage value of the transmit end candidate device and layer quantity pair is calculated. For a signal received by the base station m listed in formula (2), an interference leakage value generated when the transmit end candidate device k performs transmission at the $t^{th}$ space layer is calculated according to the following formula:

$$IL_{k,t} = \sum_{m \notin \beta(k)} \|U_m^H H_{mk} v_{k,t} x_{k,t}\|_F^2 \quad (6)$$

$$= P_{k,t} \sum_{m \notin \beta(k)} \|U_m^H H_{mk} v_{k,t}\|_F^2$$

where, $U_m$ is a receive matrix of the receive end device m, and a superscript H indicates conjugate transpose; k is a number of the transmit end candidate device, $1 \leq k \leq \mu(m)$, t is a number of each column in the precoding matrix of the transmit end candidate device, that is, a number of a min(M, N) layer in space and at which multiplexing is performed, $1 \leq t \leq \min(M, N)$, $v_{k,t}$ indicates the $t^{th}$ column in a precoding matrix of the $k^{th}$ transmit end candidate device, $P_{k,t}$ is transmit power of the $k^{th}$ transmit end candidate device at the $t^{th}$ layer of the space, and a channel fading matrix through which the signal passes to m is $H_{mk}$; $IL_{k,t}$ is an interference leakage value generated, when a transmit end device k performs transmission at the $t^{th}$ layer, at each receive end device that does not serve k; β(k) indicates a receive end device that serves k; $\|U^H H_{mk} v_{k,t}\|_F^2$ indicates calculating of F-norm for $U^H H_{mk} v_{k,t}$; and Σ indicates summation calculation.

After base stations acquire an interference leakage value generated when each transmit end candidate device performs transmission at any one of the min(M, N) layer, the base stations exchange the interference leakage values of the transmit end candidate devices, so that each base station acquires an interference leakage value of each transmit end candidate device. Finally, the base station traverses all transmit end candidate device and layer quantity pairs (k, t) served by the base station; selects, as a transmit end selected device according to the interference leakage values obtained through calculation, a device that meets a preset interference leakage condition from the transmit end candidate device and layer quantity pairs; and receives, in the receiving subspace determined by the receiving base vector, a signal sent by the transmit end selected device.

According to the interference suppression method provided in this embodiment of the present invention, ACI suppression is implemented by acquiring a receiving base vector that is matched with a signal sent by a transmit end and by selecting a device that meets a preset interference leakage condition from a transmit end candidate device, which, compared with the prior art, increases a received signal to interference plus noise ratio of a signal of a current cell and helps obtain a higher transmission rate; in addition, a multiple input multiple output (Multiple Input Multiple Output, MIMO for short) scenario in which user equipment is equipped with multiple antennas is considered, so that the interference suppression method provided in this embodiment of the present invention is applicable to a multiple-antenna scenario.

Figure 3:
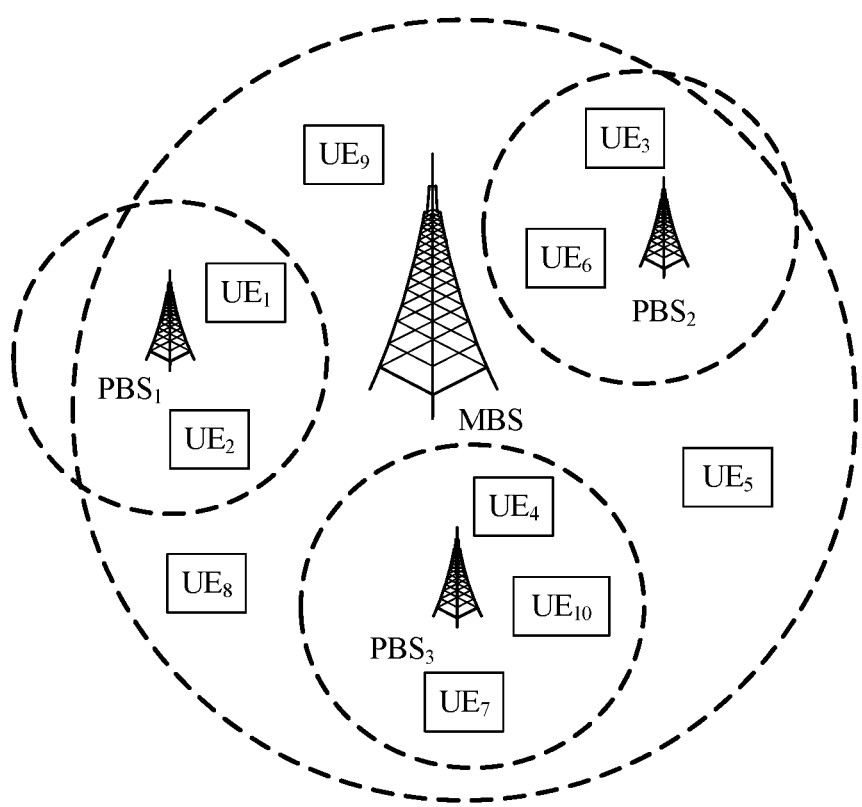
FIG. 3 is a diagram of an example of a heterogeneous network in an application scenario according to an embodiment of the present invention.

FIG. 3 is a diagram of an example of a heterogeneous network in an application scenario according to an embodiment of the present invention. As shown in FIG. 3, heterogeneous structure includes a macro base station MBS, pico base stations $PBS_1$, $PBS_2$, and $PBS_3$, macro user equipment, and pico user equipment, which are uniformly indicated herein as $UE_1$, $UE_2$ ..., $UE_9$, and $UE_{10}$. It can be seen from FIG. 3 that, $UE_5$, $UE_8$, and the $UE_9$ are macro user equipment, and UE that falls within a service range of a pico base station $PBS_j$, j=1, 2, 3, is pico user equipment, for example, the $UE_1$ and the $UE_2$ are in a service range of the $PBS_1$ and are pico user equipment of the $PBS_1$. Persons skilled in the art may understand that, in a specific implementation process, the heterogeneous structure may include multiple UE, PBSs, or MBSs, which is not limited to a quantity in this embodiment.

In this embodiment, a receive end device includes a macro receive end device and a pico receive end device, and a transmit end candidate device includes a macro transmit end candidate device and a pico transmit end candidate device. The macro receive end device is a macro base station, the pico receive end device is a pico base station, the macro transmit end candidate device is macro user equipment, and the pico transmit end candidate device is pico user equipment.

Figure 4:
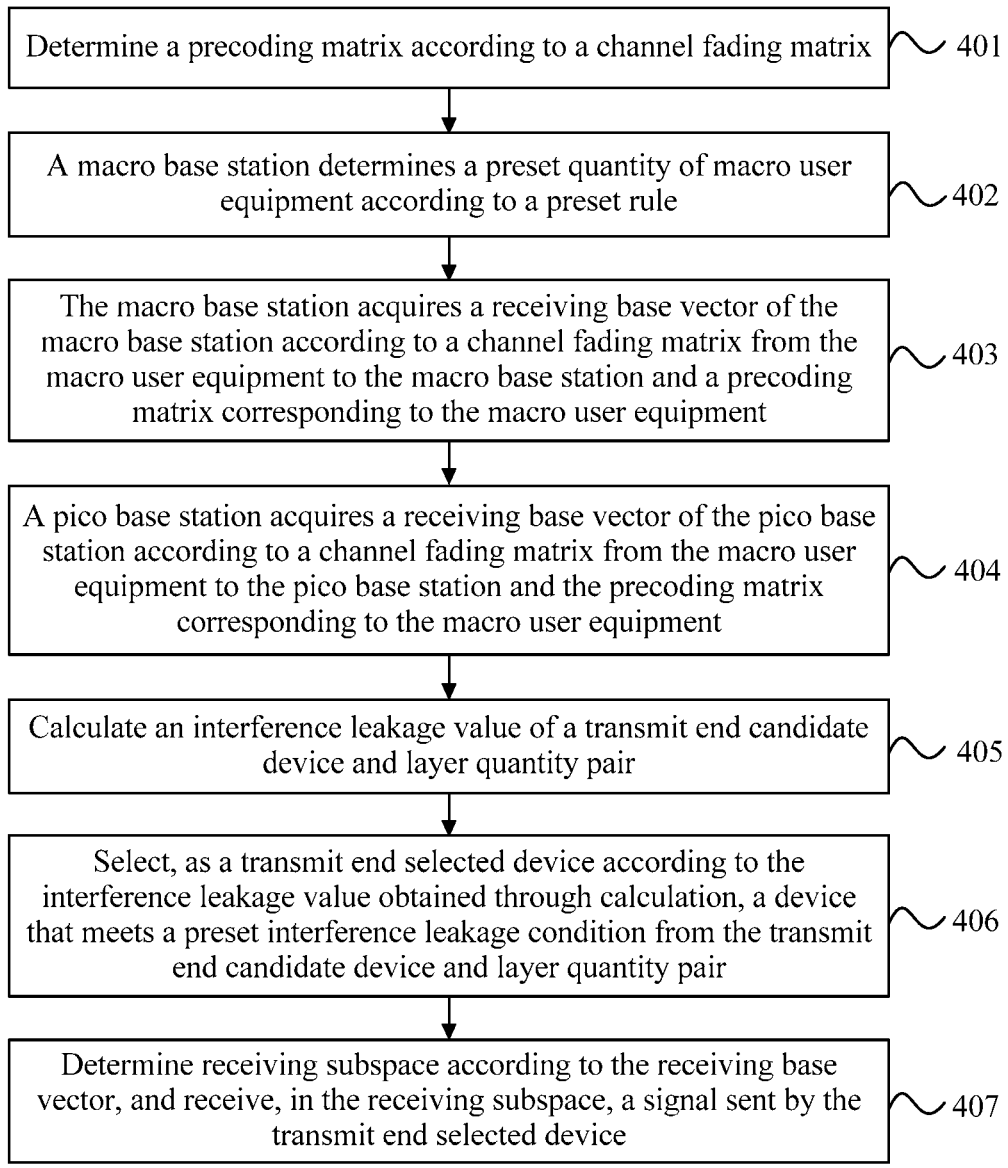
FIG. 4 is a flowchart of a second embodiment of an interference suppression method according to the present invention.

It is still assumed that all base stations are equipped with N antennas, and all user equipments are equipped with M antennas. In this embodiment, a hierarchical structure of the heterogeneous network is considered, and it is generally expected that the pico base station is transparent to the macro base station, that is, for transmission between the macro base station and the macro user equipment, existence of the pico base station and the pico user equipment is not considered. Therefore, it needs to be considered first to eliminate inter-layer interference, that is, interference from the pico user equipment to the macro user equipment and interference from the macro user equipment to the pico base station; then, intra-layer interference is eliminated, that is, interference from the pico user equipment to a pico base station that does not serve the pico user equipment. As shown in FIG. 4, a specific implementation procedure of this embodiment is as follows:

Step 401: Determine a precoding matrix according to a channel fading matrix.

For this step, reference may be made to step 101 in the foregoing embodiment, and details are not described again in this embodiment.

Step 402: A macro base station determines a preset quantity of macro user equipment according to a preset rule.

The macro base station selects a preset quantity of macro user equipment and layer quantity pairs (k, t) according to a preset criterion, where the preset rule and the preset quantity may be set according to requirements and are not limited herein. The selected macro user equipment and layer quantity pairs are denoted as $(k_1^{MUE}, t_1^{MUE})$, $(k_2^{MUE}, t_2^{MUE})$, ..., and $(k_{S_m}^{MUE}, t_{S_m}^{MUE})$, where $k^1$, $k^2$, ..., and $k_{S_m}$ macro user equipment, and $t_1$, $t_2$, ..., and $t_{S_m}$ respectively indicate numbers of min(M, N) layers in space and at which the $S_m$ macro user equipment performs multiplexing.

Step 403: The macro base station acquires a receiving base vector of the macro base station according to a channel fading matrix from the macro user equipment to the macro base station and a precoding matrix corresponding to the macro user equipment.

Specifically, the $S_m$ macro user equipment selected in step 402 falls in receiving subspace $$\text{span}\Big(\Big[H_{MBS,k_1^{MUE}} v_{k_1^{MUE}, t_1^{MUE}},$$
$$H_{MBS,k_2^{MUE}} v_{k_2^{MUE}, t_2^{MUE}}, L, H_{MBS,k_{S_m}^{MUE}} v_{k_{S_m}^{MUE}, t_{S_m}^{MUE}}\Big]\Big),$$

where $$H_{MBS,k_i^{MUE}}$$

indicates a channel fading matrix that a selected macro user equipment $k_i^{MUE}$ undergoes to a macro base station MBS, and i is between 1 and $S_m$; a matrix $$\Big[H_{MBS,k_1^{MUE}} v_{k_1^{MUE}, t_1^{MUE}}, H_{MBS,k_2^{MUE}} v_{k_2^{MUE}, t_2^{MUE}},$$
$$L, H_{MBS,k_{S_m}^{MUE}} v_{k_{S_m}^{MUE}, t_{S_m}^{MUE}}\Big]$$

is solved to acquire the receiving base vector of the macro base station, for example, Gram-Schmidt may be performed on the matrix to obtain $S_m$ orthonormalized N-dimensional vectors as receiving base vectors $B_{MBS}$ of the macro base station, and the receiving base vector $B_{MBS}$ may also be acquired by another means, such as by solving an equation set.

Step 404: A pico base station acquires a receiving base vector of the pico base station according to a channel fading matrix from the macro user equipment to the pico base station and the precoding matrix corresponding to the macro user equipment.

Specifically, receiving sub space span $$[H_{PBS_1,k_1^{MUE}} v_{k_1^{MUE},t_1^{MUE}}, H_{PBS_2,k_2^{MUE}} v_{k_2^{MUE},t_2^{MUE}}, H_{PBS_3,k_3^{MUE}} v_{k_3^{MUE},t_3^{MUE}}]$$

occupied by the macro user equipment at a pico base station $PBS_j$, j=1, 2, 3, is calculated, where $$H_{PBS_j,k_j^{MUE}}$$

indicates a channel fading matrix that selected macro user equipment MUE undergoes to the pico base station $PBS_j$; a matrix $$[H_{PBS_1,k_1^{MUE}} v_{k_1^{MUE},t_1^{MUE}}, H_{PBS_2,k_2^{MUE}} v_{k_2^{MUE},t_2^{MUE}}, H_{PBS_3,k_3^{MUE}} v_{k_3^{MUE},t_3^{MUE}}]$$

is solved to acquire the receiving base vector of the pico base station, for example, the receiving base vector is acquired in a manner of using singular value decomposition or solving an equation set. For example, left singular vectors corresponding to Sp zero singular values obtained after the singular value decomposition is performed are selected as receiving base vectors of the pico base station $PBS_j$, and the sum of $S_m$ and $S_p$ is less than or equal to N.

Step 402 to step 404 further detail step 102, and there is no time sequence relationship between step 404 and step 402 or step 403, that is, step 404 may be performed with step 402 or step 403 concurrently, or they may be performed successively.

Step 405: Calculate an interference leakage value of a transmit end candidate device and layer quantity pair.

In this step, the transmit end candidate device includes macro user equipment and pico user equipment. Referring to the method for calculating an interference leakage value in the foregoing embodiment, interference leakage values of the pico user equipment and the macro user equipment, that is, the $UE_1$, the $UE_2$, . . . , the $UE_9$, and the $UE_{10}$ shown in FIG. 3, are separately calculated.

Step 406: Select, as a transmit end selected device according to the interference leakage value obtained through calculation, a device that meets a preset interference leakage condition from the transmit end candidate device and layer quantity pair.

The preset interference leakage condition includes: an interference leakage value is minimum; or the preset interference leakage condition is a preset value, and an interference leakage value less than or equal to the preset value meets the preset interference leakage condition.

Step 407: Determine receiving subspace according to the receiving base vector, and receive, in the receiving subspace, a signal sent by the transmit end selected device.

For this step, reference may be made to step 103 in the foregoing embodiment, and details are not described again in this embodiment.

According to the interference suppression method in this embodiment of the present invention, a selection of a receiving base vector of a macro base station in a heterogeneous network and a MIMO scenario in which a transmit end candidate device is equipped with multiple antennas are considered, which, compared with the prior art, increases a received signal to interference plus noise ratio of a signal of a current cell, helps obtain a higher transmission rate, and also enables the interference suppression method provided in the present invention to be applicable to a multiple-antenna scenario. In addition, in the technical solution in the heterogeneous network provided in this embodiment, a pico base station and pico user equipment are completely transparent to the macro base station, that is, the macro base station can ignore existence of the pico base station and the pico user equipment, so that coordination with the macro base station is not required during deployment of the pico base station, thereby reducing layout difficulties of the heterogeneous network.

Figure 5:
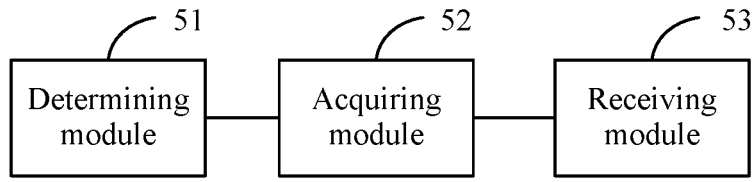
FIG. 5 is a schematic structural diagram of a first embodiment of an interference suppression apparatus according to the present invention.

FIG. 5 is a schematic structural diagram of a first embodiment of an interference suppression apparatus according to the present invention. The apparatus in this embodiment may be integrated in a base station or user equipment. As shown in FIG. 5, the apparatus in this embodiment includes a determining module 51, an acquiring module 52, and a receiving module 53.

The determining module 51 is configured to determine a precoding matrix according to a channel fading matrix, where the channel fading matrix is an N×M matrix, where M is a quantity of antennas of a transmit end candidate device, N is a quantity of antennas of a receive end device, both M and N are positive integers, and each element in the channel fading matrix is used to represent channel fading that occurs when each antenna of the transmit end candidate device transmits a signal to each antenna of the receive end device; the acquiring module 52 is configured to acquire a receiving base vector according to the precoding matrix, signal power of the transmit end candidate device, and a channel fading matrix that the signal undergoes when being sent to the receive end device; and the receiving module 53 is configured to determine receiving subspace according to the receiving base vector and receive, in the receiving subspace, a signal sent by a transmit end selected device, where the transmit end selected device is a device that is selected by the receive end device from a transmit end candidate device and layer quantity pair and that meets a preset interference leakage condition.

The interference suppression apparatus in this embodiment may be used in the technical solution in the embodiment of the interference suppression method, and implementation principles and technical effects of the apparatus are similar and are not described herein again.

In the foregoing embodiment, the determining module 51 may be specifically configured to perform singular value decomposition on the channel fading matrix, so that the precoding matrix is a matrix that is constituted by min(M, N) right singular vectors corresponding to min(M, N) maximum eigenvalues obtained after the singular value decomposition is performed, where min(M, N) indicates acquiring of the smaller value between M and N.

Further, the acquiring module 52 may be specifically configured to: according to the precoding matrix, the signal power of the transmit end candidate device, and the channel fading matrix that the signal undergoes when being sent to the receive end device, acquire a receive matrix satisfying the following expression as a receiving base vector:

$$U_m = \arg\max_{U^H U=I} U^H \left[ \sum_{\substack{(k,t)\in A \\ k\in\mu(m)}} (P_{k,t} H_{mk} v_{k,t} v_{k,t}^H H_{mk}^H) \right] U$$

where, U is an N×S-dimensional complex matrix, and S indicates a quantity of signal streams that the receive end device needs to receive; a superscript H indicates conjugate transpose;

$$\max_{U^H U=I}$$

indicates calculating of a maximum value of the matrix function in all U meeting a condition $U^U=I$, and I is an identity matrix; arg indicates calculating of a corresponding independent variable value $U_m$ when the maximum value of the matrix function is acquired; k is a number of the transmit end candidate device, $1\le k\le\mu(m)$, t is a number of each column in the precoding matrix of the transmit end candidate device, that is, a number of a min(M, N) layer in space and at which multiplexing is performed, $1\le t\le\min(M, N)$, $\mu(m)$ indicates a set of transmit end candidate devices served by m, and $A=\{(k,t):1\le k\le\mu(m),1\le t\le\min(M, N)\}$ indicates a set of all possible transmit end candidate device and layer quantity pairs; $v_{k,t}$ indicates the $t^{th}$ column in a precoding matrix of the $k^{th}$ transmit end candidate device, $P_{k,t}$ is transmit power of the $k^{th}$ transmit end candidate device at the $t^{th}$ layer of the space, and a channel fading matrix through which the signal passes to m is $H_{mk}$; and Σ indicates summation calculation.

The receive matrix may be a matrix that is constituted by character vectors corresponding to S maximum eigenvalues of $$\sum_{\substack{(k,t)\in A \\ k\in\mu(m)}} (P_{k,t} H_{mk} v_{k,t} v_{k,t}^H H_{mk}^H),$$

and may also be acquired in another manner.

Based on FIG. 5, a receive end device may include a macro receive end device and a pico receive end device, and a transmit end candidate device may include a macro transmit end candidate device and a pico transmit end candidate device. In this embodiment, a macro base station is used as a macro receive end device, a pico base station is used as a pico receive end device, macro user equipment is used as a macro transmit end candidate device, and pico user equipment is used as pico transmit end candidate device.

Figure 6:
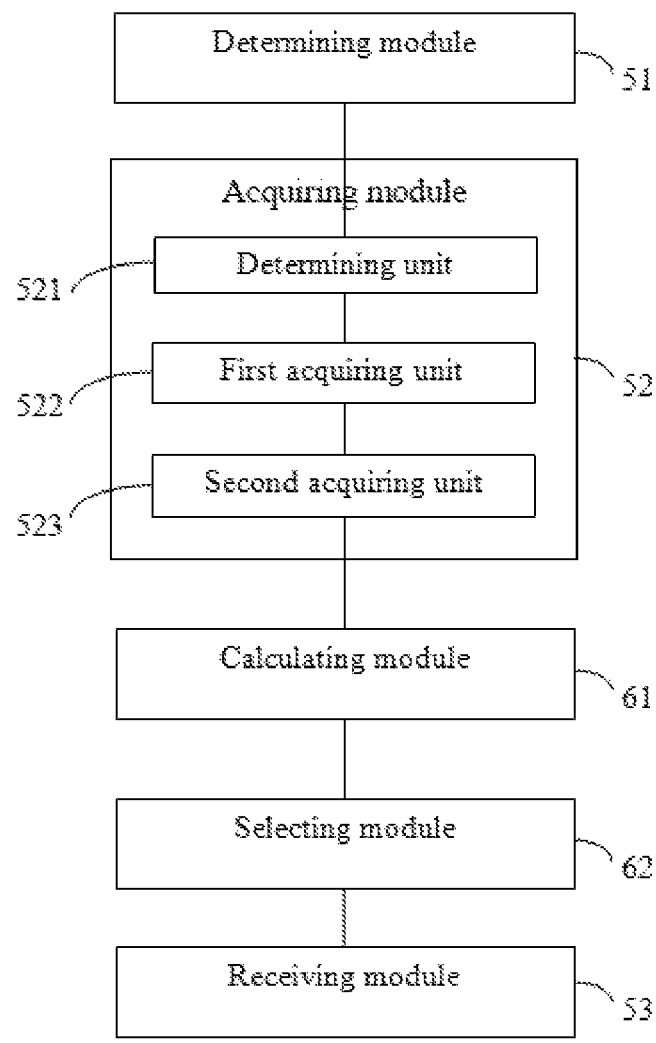
FIG. 6 is a schematic structural diagram of a second embodiment of an interference suppression apparatus according to the present invention.

FIG. 6 is a schematic structural diagram of a second embodiment of an interference suppression apparatus according to the present invention. As shown in FIG. 6, the acquiring module 52 may include:

a determining unit 521, configured to determine a preset quantity of macro transmit end candidate device and layer quantity pairs according to a preset rule; a first acquiring unit 522, configured to acquire a receiving base vector of a macro receive end device according to a channel fading matrix from a macro transmit end candidate device to the macro receive end device and a precoding matrix corresponding to the macro transmit end candidate device; and a second acquiring unit 523, configured to acquire a receiving base vector of a pico receive end device according to a channel fading matrix from the macro transmit end candidate device to the pico receive end device and the precoding matrix corresponding to the macro transmit end candidate device.

The apparatus in this embodiment is configured to perform the technical solution in the method embodiment shown in FIG. 4, and implementation principles and technical effects of the apparatus are similar and are not described herein again.

Based on the foregoing, the interference suppression apparatus in this embodiment may further include: a calculating module 61, configured to calculate an interference leakage value of the transmit end candidate device and layer quantity pair.

An interference leakage value generated when the transmit end candidate device performs transmission at the $t^{th}$ space layer is calculated according to the following formula:

$$IL_{k,t} = P_{k,t} \sum_{m\ne\beta(k)} \|U_m^H H_{mk} v_{k,t}\|_F^2$$

where, $U_m$ is a receive matrix of a receive end device m, and a superscript H indicates conjugate transpose; k is a number of the transmit end candidate device, $1\le k\le\mu(m)$, t is a number of each column in the precoding matrix of the transmit end candidate device, that is, a number of a min(M, N) layer in space and at which multiplexing is performed, $1\le t\le\min(M, N)$, $v_{k,t}$ indicates the $t^{th}$ column in a precoding matrix of the $k^{th}$ transmit end candidate device, $P_{k,t}$ is transmit power of the $k^{th}$ transmit end candidate device at the $t^{th}$ layer of the space, and a channel fading matrix through which the signal passes to m is $H_{mk}$; $IL_{k,t}$ is an interference leakage value generated, when a transmit end device k performs transmission at the $t_{th}$ layer, at each receive end device that does not serve k; $\beta(k)$ indicates a receive end device that serves k; $\|U^H H_{mk} v_{k,t}\|_F^2$ indicates calculating of F-norm for $U^H H_{mk} v_{k,t}$; and Σ indicates summation calculation.

Further, the interference suppression apparatus may further include: a selecting module 62, configured to select, as a transmit end selected device according to the interference leakage value obtained through calculation, a device that meets the preset interference leakage condition from the transmit end candidate device and layer quantity pair. The preset interference leakage condition may include: an interference leakage value is minimum; or the preset interference leakage condition is a preset value, and an interference leakage value less than or equal to the preset value meets the preset interference leakage condition.

According to the interference suppression apparatus in this embodiment of the present invention, a selection of a receiving base vector of a macro base station in a heterogeneous network and a MIMO scenario in which a transmit end candidate device is equipped with multiple antennas are considered, which, compared with the prior art, increases a received signal to interference plus noise ratio of a signal of a current cell, helps obtain a higher transmission rate, and also enables the interference suppression method provided in the present invention to be applicable to a multiple-antenna scenario. In addition, in the technical solution in the heterogeneous network provided in this embodiment, a pico base station and pico user equipment are completely transparent to the macro base station, that is, the macro base station can ignore existence of the pico base station and the pico user equipment, so that coordination with the macro base station is not required during arrangement of the pico base station, thereby reducing layout difficulties of the heterogeneous network.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
determining, by an apparatus, a precoding matrix according to a channel fading matrix based on signals transmitted from each antenna of a candidate transmit end device to each antenna of a receive end device, wherein the channel fading matrix is an N×M matrix, wherein M is a quantity of antennas of the candidate transmit end device, N is a quantity of antennas of the receive end device, both M and N are positive integers, and each element in the channel fading matrix is used to represent channel fading that a respective signal undergoes when being transmitted from a respective antenna of the candidate transmit end device to a respective antenna of the receive end device;
acquiring, by the apparatus, a receiving base vector according to: the precoding matrix, signal power of the candidate transmit end device, and the channel fading matrix; and
determining, by the apparatus, a receiving subspace according to the receiving base vector, and receiving, in the receiving subspace, a signal sent by a selected transmit end device, wherein the selected transmit end device is the candidate transmit end device, and wherein a candidate transmit end device and layer quantity pair corresponding to the candidate transmit end device meets a preset interference leakage condition.

2. The method according to claim 1, wherein determining the precoding matrix further comprises:
performing singular value decomposition on the channel fading matrix, so that the precoding matrix is constituted by min(M, N) right singular vectors corresponding to min(M, N) maximum eigenvalues obtained after the singular value decomposition is performed, wherein min(M, N) indicates acquiring of the smaller value between M and N.

3. The method according to claim 1, wherein acquiring the receiving base vector further comprises:
acquiring a receive matrix satisfying the following expression as the receiving base vector:

$$U_m = \arg \max_{U^H U = I} U^H \left[ \sum_{\substack{(k,t) \in A \\ k \in \mu(m)}} (P_{k,t} H_{mk} v_{k,t} v_{k,t}^H H_{mk}^H) \right] U$$

wherein U is an N×S-dimensional complex matrix, and S indicates a quantity of signal streams that the receive end device needs to receive; a superscript H indicates conjugate transpose;

$$\max_{U^H U = I}$$

indicates calculating of a maximum value of a matrix function in all U meeting a condition $U^H U = I$, and I is an identity matrix; arg indicates calculating of a corresponding independent variable value $U_m$ when the maximum value of the matrix function is acquired; k is a number of a respective candidate transmit end device, $1 \leq k \leq \mu(m)$, t is a number of a respective column in the precoding matrix of a respective candidate transmit end device corresponding to a number of a min(M, N) layer in space and at which multiplexing is performed, $1 \leq t \leq \min(M, N)$, $\mu(m)$ indicates a set of candidate transmit end devices served by a base station m, and $A = \{(k,t): 1 \leq k \leq \mu(m), 1 \leq t \leq \min(M, N)\}$ indicates a set of all possible candidate transmit end device and layer quantity pairs; $v_{k,t}$ indicates at $t^{th}$ column in a precoding matrix of a $k^{th}$ candidate transmit end device, $P_{k,t}$ is transmit power of a $k^{th}$ candidate transmit end device at a $t^{th}$ layer of the space, and $H_{mk}$ is a channel fading matrix corresponding to the base station m; and Σ indicates summation calculation.

4. The method according to claim 3, wherein the receive matrix is constituted by character vectors corresponding to S maximum eigenvalues of $$\sum_{\substack{(k,t) \in A \\ k \in \mu(m)}} (P_{k,t} H_{mk} v_{k,t} v_{k,t}^H H_{mk}^H).$$

5. The method according to claim 2, wherein the receive end device comprises a macro receive end device and a pico receive end device, and the candidate transmit end device comprises a macro candidate transmit end device and a pico candidate transmit end device; and
wherein acquiring the receiving base vector further comprises:
determining, by the macro receive end device, a preset quantity of macro candidate transmit end device and layer quantity pairs according to a preset rule;
acquiring, by the macro receive end device, a receiving base vector of the macro receive end device according to a channel fading matrix corresponding to signals sent from the macro candidate transmit end device to the macro receive end device and a precoding matrix corresponding to the macro candidate transmit end device; and
acquiring, by the pico receive end device, a receiving base vector of the pico receive end device according to a channel fading matrix corresponding to signals sent from the macro candidate transmit end device to the pico receive end device and the precoding matrix corresponding to the macro candidate transmit end device.

6. The method according to claim 1, wherein before determining the receiving subspace and receiving the signal from the selected transmit end device, the method further comprises:

calculating an interference leakage value of the candidate transmit end device and layer quantity pair.

7. The method according to claim 6, wherein calculating the interference leakage value of the candidate transmit end device and layer quantity pair further comprises:

calculating, according to the following formula, an interference leakage value generated when the candidate transmit end device performs transmission at the $t^{th}$ space layer:

$$IL_{k,t} = P_{k,t} \sum_{m \neq \beta(k)} \|U_m^H H_{mk} v_{k,t}\|_F^2$$

wherein $U_m$ is a receive matrix of a receive end device m, and a superscript H indicates conjugate transpose; k is a number of a respective candidate transmit end device, $1 \leq k \leq \mu(m)$, t is a number of a respective column in the precoding matrix of the candidate transmit end device corresponding to a number of a min(M, N) layer in space and at which multiplexing is performed, $1 \leq t \leq \min(M, N)$, $v_{k,t}$ indicates a $t^{th}$ column in a precoding matrix of a $k^{th}$ candidate transmit end device, $P_{k,t}$ is transmit power of a $k^{th}$ candidate transmit end device at a $t^{th}$ layer of the space, and $H_{mk}$ is a channel fading matrix corresponding to a base station m; $IL_{k,t}$ is the interference leakage value generated, when the candidate transmit end device performs transmission at the $t^{th}$ layer, at each receive end device that does not serve the $k^{th}$ candidate transmit end device; $\beta(k)$ indicates a receive end device that serves a $k^{th}$ candidate transmit end device; $\|U^H H_{mk} v_{k,t}\|_F^2$ indicates calculating of F-norm for $U^H H_{mk} v_{k,t}$; and $\Sigma$ indicates summation calculation.

8. The method according to claim 1, wherein the preset interference leakage condition comprises:

an interference leakage value being at a minimum value; or an interference leakage value being less than or equal to a preset value.

9. A non-transitory computer-readable medium having processor-executable instructions stored thereon, the processor-executable instructions, when executed, facilitating the following:

determining a precoding matrix according to a channel fading matrix based on signals transmitted from each antenna of a candidate transmit end device to each antenna of a receive end device, wherein the channel fading matrix is an N×M matrix, wherein M is a quantity of antennas of the candidate transmit end device, N is a quantity of antennas of the receive end device, both M and N are positive integers, and each element in the channel fading matrix is used to represent channel fading that a respective signal undergoes when being transmitted from a respective antenna of the candidate transmit end device to a respective antenna of the receive end device;

acquiring a receiving base vector according to: the precoding matrix, signal power of the candidate transmit end device, and the channel fading matrix; and determining a receiving subspace according to the receiving base vector, and receiving, in the receiving subspace, a signal sent by a selected transmit end device, wherein the selected transmit end device is the candidate transmit end device, and wherein a candidate transmit end device and layer quantity pair corresponding to the candidate transmit end device meets a preset interference leakage condition.

10. The non-transitory computer-readable medium according to claim 9, wherein determining the precoding matrix further comprises:

performing singular value decomposition on the channel fading matrix, so that the precoding matrix is constituted by min(M, N) right singular vectors corresponding to min(M, N) maximum eigenvalues obtained after the singular value decomposition is performed, wherein min(M, N) indicates acquiring of the smaller value between M and N.

11. The non-transitory computer-readable medium according to claim 10, wherein the receive end device comprises a macro receive end device and a pico receive end device, and the candidate transmit end device comprises a macro candidate transmit end device and a pico candidate transmit end device; and wherein acquiring the receiving base vector further comprises:

determining, by the macro receive end device, a preset quantity of macro candidate transmit end device and layer quantity pairs according to a preset rule;

acquiring, by the macro receive end device, a receiving base vector of the macro receive end device according to a channel fading matrix corresponding to signals sent from the macro candidate transmit end device to the macro receive end device and a precoding matrix corresponding to the macro candidate transmit end device; and acquiring, by the pico receive end device, a receiving base vector of the pico receive end device according to a channel fading matrix corresponding to signals sent from the macro candidate transmit end device to the pico receive end device and the precoding matrix corresponding to the macro candidate transmit end device.

12. The non-transitory computer-readable medium according to claim 9, wherein acquiring the receiving base vector further comprises:

acquiring a receive matrix satisfying the following expression as the receiving base vector:

$$U_m = \arg \max_{U^H U = I} U^H \left[ \sum_{\substack{(k,t) \in A \\ k \in \mu(m)}} (P_{k,t} H_{mk} v_{k,t} v_{k,t}^H H_{mk}^H) \right] U$$

wherein U is an N×S-dimensional complex matrix, and S indicates a quantity of signal streams that the receive end device needs to receive; a superscript H indicates conjugate transpose;

$$\max_{U^H U = I}$$

indicates calculating of a maximum value of a matrix function in all U meeting a condition $U^H U = I$, and I is an identity matrix; arg indicates calculating of a corresponding independent variable value $U_m$ when the maximum value of the matrix function is acquired; k is a number of a respective candidate transmit end device, $1 \leq k \leq \mu(m)$, t is a number of a respective column in the precoding matrix of a respective candidate transmit end device corresponding to a number of a min(M, N) layer in space and at which multiplexing is performed, $1 \leq t \leq \min(M, N)$, $\mu(m)$ indicates a set of candidate transmit end devices served by a base station m, and $A=\{(k,t):1 \leq k \leq \mu(m), 1 \leq t \leq \min(M, N)\}$ indicates a set of all possible candidate transmit end device and layer quantity pairs; $v_{k,t}$ indicates at $t^{th}$ column in a precoding matrix of a $k^{th}$ candidate transmit end device, $P_{k,t}$ is transmit power of a $k^{th}$ candidate transmit end device at a $t^{th}$ layer of the space, and $H_{mk}$ is a channel fading matrix corresponding to the base station m; and $\Sigma$ indicates summation calculation.

13. The non-transitory computer-readable medium according to claim 12, wherein the receive matrix is constituted by character vectors corresponding to S maximum eigenvalues of $$\sum_{\substack{(k,t) \in A \\ k \in \mu(m)}} (P_{k,t} H_{mk} v_{k,t} v_{k,t}^H H_{mk}^H).$$

14. The non-transitory computer-readable medium according to claim 9, wherein the processor-executable instructions, when executed, further facilitate before determining the receiving subspace and receiving the signal from the selected transmit end device, calculating an interference leakage value of the candidate transmit end device and layer quantity pair.

15. The non-transitory computer-readable medium according to claim 14, wherein calculating the interference leakage value of the candidate transmit end device and layer quantity pair further comprises:

calculating, according to the following formula, an interference leakage value generated when the candidate transmit end device performs transmission at the $t^{th}$ space layer:

$$IL_{k,t} = P_{k,t} \sum_{m \neq \beta(k)} \|U_m^H H_{mk} v_{k,t}\|_F^2$$

wherein $U_m$ is a receive matrix of a receive end device m, and a superscript H indicates conjugate transpose; k is a number of a respective candidate transmit end device, $1 \leq k \leq \mu(m)$, t is a number of a respective column in the precoding matrix of the candidate transmit end device corresponding to a number of a min(M, N) layer in space and at which multiplexing is performed, $1 \leq t \leq \min(M, N)$, $v_{k,t}$ indicates a $t^{th}$ column in a precoding matrix of a $k^{th}$ candidate transmit end device, $P_{k,t}$ is transmit power of a $k^{th}$ candidate transmit end device at a $t^{th}$ layer of the space, and $H_{mk}$ is a channel fading matrix corresponding to a base station m; $IL_{k,t}$ is the interference leakage value generated, when the candidate transmit end device performs transmission at the $t^{th}$ layer, at each receive end device that does not serve the $k^{th}$ candidate transmit end device; $\beta(k)$ indicates a receive end device that serves a $k^{th}$ candidate transmit end device; $\|U^H H_{mk} v_{k,t}\|_F^2$ indicates calculating of F-norm for $U^H H_{mk} v_{k,t}$; and $\Sigma$ indicates summation calculation.

16. The non-transitory computer-readable medium according to claim 9, wherein the preset interference leakage condition comprises:

an interference leakage value being at a minimum value; or an interference leakage value being less than or equal to a preset value.

* * * * *